United States Patent
Sobolev et al.

(10) Patent No.: US 11,359,964 B2
(45) Date of Patent: *Jun. 14, 2022

(54) AUTOMATED DELAY LINE ALIGNMENT

(71) Applicant: UltraFast Systems LLC, Sarasota, FL (US)

(72) Inventors: Alexander Sobolev, Sarasota, FL (US); Nikita Kurakin, Sarasota, FL (US); Alexey Gusev, Sarasota, FL (US)

(73) Assignee: Ultrafast Systems LLC, Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/014,005

(22) Filed: Sep. 8, 2020

(65) Prior Publication Data

US 2020/0400493 A1    Dec. 24, 2020

Related U.S. Application Data

(63) Continuation of application No. 15/753,470, filed as application No. PCT/US2017/036961 on Jun. 12, 2017, now Pat. No. 10,809,125, which is a continuation-in-part of application No. PCT/US2016/047838, filed on Aug. 19, 2016.

(60) Provisional application No. 62/208,546, filed on Aug. 21, 2015.

(51) Int. Cl.
| | |
|---|---|
| *G01J 3/02* | (2006.01) |
| *G01N 21/63* | (2006.01) |
| *G01J 1/42* | (2006.01) |
| *G01B 11/27* | (2006.01) |
| *G01J 1/30* | (2006.01) |

(52) U.S. Cl.
CPC .......... *G01J 3/0289* (2013.01); *G01B 11/272* (2013.01); *G01J 1/30* (2013.01); *G01J 1/4257* (2013.01); *G01J 3/0291* (2013.01); *G01J 3/0297* (2013.01); *G01N 21/636* (2013.01); *G01N 2201/06113* (2013.01)

(58) Field of Classification Search
CPC ...... G01J 3/0289; G01J 1/4257; G01J 3/0291; G01J 1/30; G01J 3/0297; G01B 11/272; G01N 21/636; G01N 2201/06113
See application file for complete search history.

(56) References Cited

U.S. PATENT DOCUMENTS

| | | | |
|---|---|---|---|
| 4,866,362 | A | 9/1989 | Parker et al. |
| 4,867,560 | A | 9/1989 | Kunitsugu |
| 5,536,916 | A | 7/1996 | Kohari et al. |
| 8,724,111 | B2 | 5/2014 | Gusev |
| 2004/0030519 | A1 | 2/2004 | Messina |

(Continued)

OTHER PUBLICATIONS

Ironside et al. "A self-aligning scanning optical delay line" Journal of Physics E. Scientific Instruments, IOP Publishing, Bristol, GB, vol. 17, No. 6, pp. 440-441, XP020017383, ISSN: 0022-3735, DOI: 10.1088/0022-3735/17/6/003 Jun. 1, 1984.

(Continued)

*Primary Examiner* — Hina F Ayub
(74) *Attorney, Agent, or Firm* — SmithAmundsen LLC

(57) ABSTRACT

A system and method for pre-aligning a light beam in a spectroscopic measuring device such as a pump-probe device prior to conducting a measurement procedure is provided, which eliminates the need for monitoring or modification of the beam trajectory through adjustments of elements transmitting the beam (e.g., mirrors) over the course of a measurement process.

9 Claims, 4 Drawing Sheets

(56) References Cited

U.S. PATENT DOCUMENTS

2004/0056010 A1    3/2004  Ho et al.
2006/0222043 A1  10/2006  Cahill
2007/0020785 A1    1/2007  Bruland et al.
2013/0088709 A1    4/2013  Koenig et al.

OTHER PUBLICATIONS

International Search Report and Written Opinion for International Application No. PCT/US2017/36961 dated Oct. 18, 2017, 12 pages.
International Search Report and Written Opinion for International Application No. OCT/US16/47838 dated Nov. 21, 2016, 12 pages.

AUTOMATED DELAY LINE ALIGNMENT

FIELD OF THE INVENTION

Embodiments of this invention relate to a system and methods for aligning a light beam through a moveable optical delay line in an optically gated (pump-probe) spectrometer prior to conducting a measurement process. The disclosed alignment process pre-aligns the beam to a desired and constant pointing (trajectory) after the delay line without the need for further modification of the beam trajectory through adjustments of elements (e.g., mirrors) transmitting the beam over the course of a pump-probe measurement process.

BACKGROUND OF THE INVENTION

Optically gated spectroscopy methods (pump-probe transient absorption, fluorescence upconversion, etc.) are widely used to study fast photo-induced processes (e.g., chemical reactions, etc.). In a pump-probe setup, a laser beam is split into a pump pulse and a temporary delayed probe pulse. In general, a sample is irradiated with a laser beam pump pulse, which generates an excitation (or other perturbation) in the sample. Then, after an adjustable time delay and while the excited state is being relaxed, a laser beam probe pulse is sent to the sample. The pump-probe pulse time delay is typically controlled with an optical delay line. By analyzing the intensity of the light from the probe pulse, the transmission or reflectance of the sample is measured. The irradiation with the laser beam pump pulse and probe pulse and analysis are repeated over a series of pump-probe time delays to measure the photo-induced changes in the sample over time after the periodic excitation by the laser beam pump pulse.

An optical delay line generally works by precisely controlling the position (location) of a moveable retroreflector along a track. In a retroreflector, a light beam enters and is reflected back along a vector that is parallel but opposite to the direction from the beam's source. Any change in the position of the retroreflector along the track will affect the path length that the light beam has to travel before arriving at the sample. One can calculate how much the laser pulse is delayed in time with each change in the position of the retroreflector along the track based on the speed of light. By monitoring the laser beam probe pulse as a function of the time delay, information can be obtained on the decay of the generated excitation in the sample or on other processes or activity initiated by the laser beam pump pulse.

FIG. 1 illustrates an embodiment of a conventional pump-probe arrangement. As illustrated, the pump-probe device 10 includes a laser source 12 which generates a laser beam 14, and a semitransparent beam splitter 16 which splits the laser beam 14 into a pump pulse beam 18 and a probe pulse beam 20. The two laser beams follow different optical paths but are spatially overlapped in the sample 22. The pump pulse beam 18 is directed via a series of mirrors to the sample 22, and the incoming probe pulse beam 20a is directed to a variable (motorized) optical delay line 24. The optical delay line 24 is a reflective device which includes a retroreflector assembly 30 mounted on a motorized translation stage 28 (mounting platform), which is typically mobile on ball bearings and can be moved manually or by motor along a track or trajectory (arrow ↔). In general, a retroreflector is an optical device that is designed to exhibit retroreflection, and typically consists of three mirrors that are arranged to form the corner of a cube (e.g., corner cube retroreflector, hollow cube retroreflector, etc.). For illustration purposes, the retroreflector assembly 30 in FIG. 1 is shown with two mirrors 30a, 30b. Over the course of the measurement period, the translation stage 28 with the retroreflector assembly 30 is translated along the track in order to modify the length of the beam path of the probe pulse beam 20 relative to the length of the pump pulse beam 18, thus delaying the delivery of the probe pulse beam to the sample by a set amount of time. The outgoing probe beam 20b from the retroreflector assembly 30 is directed by mirror 30b along a trajectory downstream from the delay line to mirror 32 and then to mirror 34, which directs the beam onto the sample 22. After reflection or transmission through the sample, the intensity of the probe beam 20 is monitored.

Correct alignment of the incoming probe beam 20a with the retroreflector assembly 30 of the moveable optical delay line 24 at different locations along the track is a critical requirement of pump-probe measurement experiments because at any point on the delay line trajectory (arrow ↔), pointing of the outgoing probe pulse beam 20a into the delay line 24 needs to remain along the same trajectory (arrow →) over the course of the measurements. This is accomplished by properly aligning the incoming beam 20a by means of mirrors 16, 26 before the incoming beam enters the delay line 24. If the incoming beam 20a trajectory is not aligned with a proper axis of the translation stage, pointing and the trajectory of the outgoing probe pulse beam 20b from the retroreflector will vary as the translation stage 28 (and retroreflector) is translated (moved) along the track (arrow ↔) over the course of the measurements. This will in turn affect the spatial overlap of the pump beam 18 and the probe beam 20 in the sample and result in inaccurate data. However, achieving accurate alignment of the incoming probe beam 20a through the translation stage 28 and retroreflector mirrors 30a, 30b of the optical delay line 24 is time consuming and requires special technical training.

Alignment of the incoming probe beam 20a through the translation stage 28 and retroreflector mirrors 30a, 30b of the delay line 24 is currently performed by manually adjusting the steering mirror 26 which directs the probe pulse beam 20a into the delay line. Upon moving the translation stage 28 (and the retroreflector 30) of the delay line 24 to different locations from one end of the track to the other end, and monitoring the position and trajectory of the outgoing probe pulse beam 20b, for example, using a commercially available beam profiler or position sensitive detector 40 in combination with a beam splitter (mirror) 38, which splits the outgoing probe pulse beam 20b and directs it to the detector 40, or by monitoring the beam position on a target by eye, the angle of the steering mirror 26 is then manually adjusted based on those observations to minimize "walk-off" (i.e., drift) of the trajectory of the outgoing probe beam 20b by ensuring that the incoming beam 20a is aligned and enters the delay line parallel to the axis of translation 36 of the delay line. However, the problem with this approach is that only one mirror 26 can be steered, and a user has no control over the pointing (trajectory) of the outgoing probe pulse beam 20b after the delay line. Consequently, subsequent alignment of the optical set-up (e.g., at least mirrors 32 and 34 and possibly other mirrors) situated "downstream" from the delay line 24 is required after performing each alignment of the incoming probe beam 20a with the delay line.

FIG. 2 illustrates another embodiment of a conventional system 10' that aligns a beam with a delay line by active beam stabilization. Such systems actively compensate for changes in the alignment of the trajectory of the outgoing beam from the retroreflector in order to maintain beam pointing along a proper trajectory. In an active beam stabilization system 10', motorized mirrors M1, M2 are controlled and actively adjusted during a measurement period through a feedback loop by a closed loop controller 42, 44 connected to a corresponding position sensitive photodetector 40a, 40b. When a beam coordinate moves away from the center of the photodetector 40a, 40b, the motorized steering mirror M1, M2 is activated to compensate for the displacement and bring the beam back onto the center of the detector. This is done at high speed to ensure minimum beam displacement caused by changes in the optical set-up (i.e., mirrors M1, M2, etc.). In this method, the distances between the mirror M1, M2 and the photodetector 40a, 40b are not taken into account. The beam stabilization is achieved by simply actively adjusting mirrors M1, M2 to keep the beam traveling along a trajectory through the same two points in space during the measurement period.

However, an active beam stabilization approach is unacceptable in a pump-probe experiment because once the delay line scanning starts along the track (arrow ↔) to modify the time delay between the pump pulse and the probe pulse, the trajectory of the incoming or outgoing beam into and out of the delay line cannot be actively re-aligned to keep the incoming and outgoing beams pointing along the proper trajectory. Such an "on the fly" realignment to change the beam trajectory will unpredictably affect how much the laser beam gets delayed with changing the position of the retroreflector of the delay line along the track.

Accordingly, there is a need for a set-up and method for pre-aligning a probe pulse beam in relation to the location of a delay line along a track (trajectory) in an optically gated spectroscopy measurement system that will overcome the foregoing problems. In particular, there is a need for a set-up and method for pre-aligning a probe pulse beam prior to a measurement procedure whereby the initially aligned trajectory of the incoming and outgoing probe pulse beam into and out of the delay line is maintained during the measurement procedure with the changing location of the delay line along a track, without conducting an active beam stabilization during the procedure to realign the trajectory of the beam.

SUMMARY OF THE INVENTION

In embodiments, the invention provides a system for aligning a light beam in a spectroscopic measuring device, the aligning system comprising:
a first motorized mirror positioned to receive and transmit a light beam;
a second motorized mirror positioned relative to the first mirror to receive the light beam from the first mirror and transmit the light beam to a delay line;
a third mirror positioned to receive the light beam from the delay line and transmit said light beam to a detector; and
a computer-based processor in communication with the detector and the first and second mirrors, the processor configured to a) receive and process data relating to the light beam from the detector, and b) cause movement of the first and second mirrors to change an angle of the mirrors based on the data relating to the light beam.

In one embodiment, the invention provides a system for pre-aligning a light beam in a pump-probe spectroscopic measuring device, the aligning system comprising:
a motorized, variable optical delay line comprising a retroreflector and being moveable along a track along an axis of translation;
a position sensitive detector;
a first motorized mirror positioned to receive and transmit an incoming light beam;
a second motorized mirror positioned relative to the first mirror to receive the incoming light beam from the first mirror and transmit the incoming light beam to the retroreflector of the delay line, the second mirror positioned apart from and prior to the delay line;
a third mirror positioned to receive an outgoing light beam from the retroreflector of the delay line and transmit said outgoing light beam to a detector; and
a computer-based processor in communication with the detector, the delay line and the first and second mirrors.

In an embodiment, the computer-based processor is configured to:
a) receive and process data from the detector during a pre-alignment procedure, which data relates to the location of the outgoing light beam from the delay line on the detector, and
b) cause movement of the first and second mirrors to position the mirrors at a set angle based on the data from the detector relating to the location of the outgoing light beam on the detector, to align the incoming beam and the outgoing beam along a trajectory such that the incoming beam enters the delay line parallel to its axis of translation and the outgoing beam does not substantially shift on the detector during the pre-alignment procedure as the position of the delay line is changed.

In embodiments, the processor is configured to conduct steps a) and b) solely during a pre-alignment process prior to a measurement procedure (e.g., a pump-probe procedure).

In other embodiments, the invention provides a method for pre-aligning a light beam in a spectroscopic measuring device such as a pump-probe device prior to conducting a pump-probe measurement procedure.

After the pre-alignment procedure is completed and the measurement procedure (e.g., a pump-probe procedure) commences, the trajectory of the incoming beam from the first and second mirrors into the retroreflector of the delay line remains parallel to the axis of translation of the delay line as the position of the delay line is varied over the course of the measurement procedure, and the trajectory of the outgoing beam from the retroreflector is maintained without detection or active beam stabilization through a feedback loop to the computer-based processor to change the angles of the first and second mirrors or the trajectory of the incoming and outgoing beams.

DETAILED DESCRIPTION OF THE INVENTION

Various embodiments of the present invention relate to methods for aligning an optical delay line to maintain the initial probe beam pointing after the delay line over the course of a pump-probe measurement process.

Figure 1:
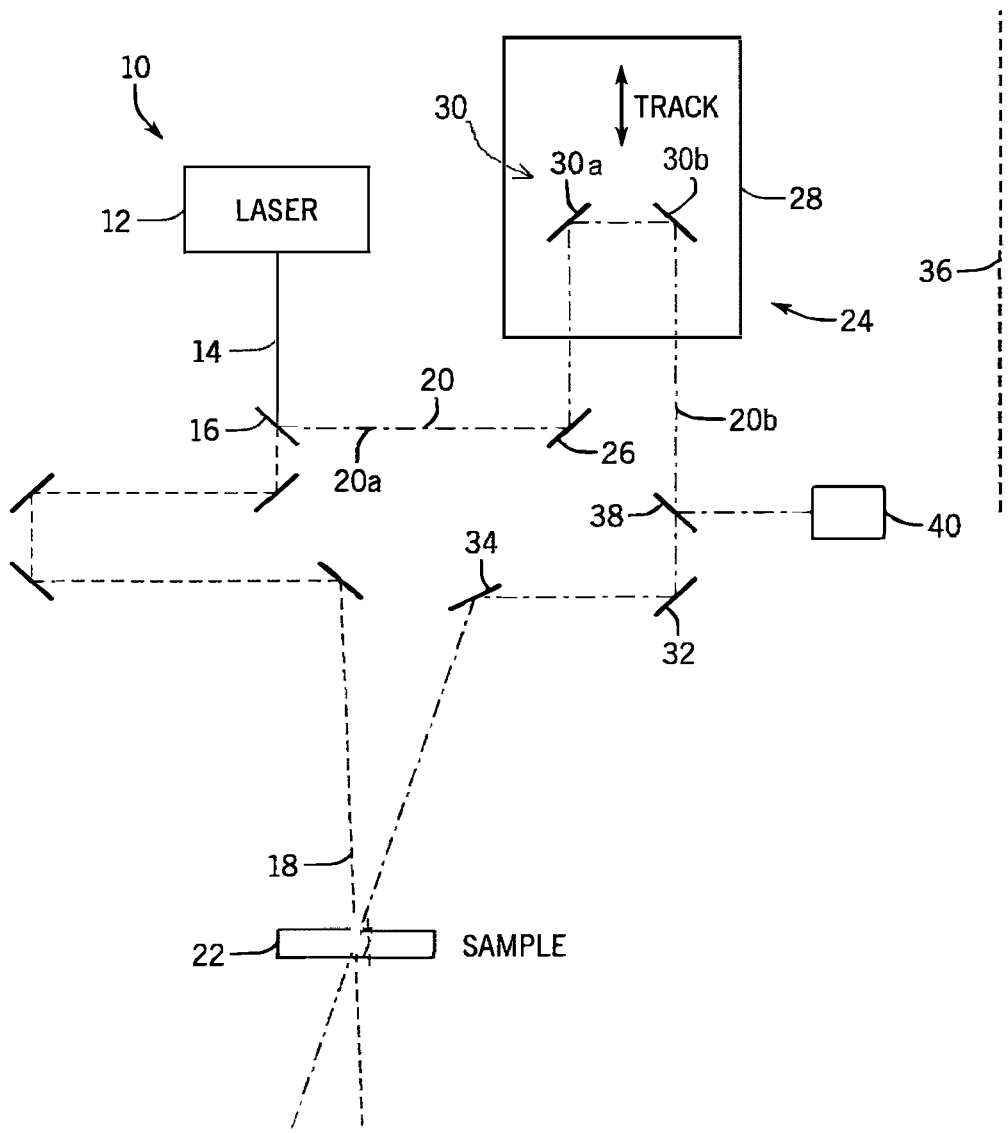
FIG. 1 is a depiction of an embodiment of a conventional pump probe arrangement.
Figure 2:
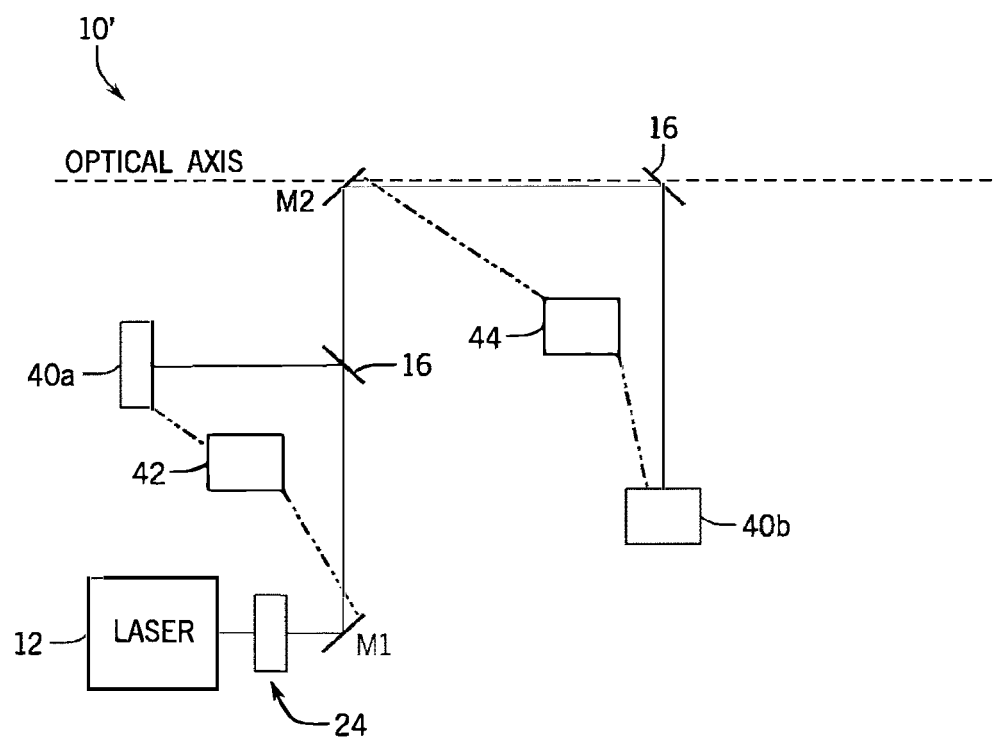
FIG. 2 is a depiction of another embodiment of a conventional system that aligns a beam with a delay line by active beam stabilization.
Figure 3:
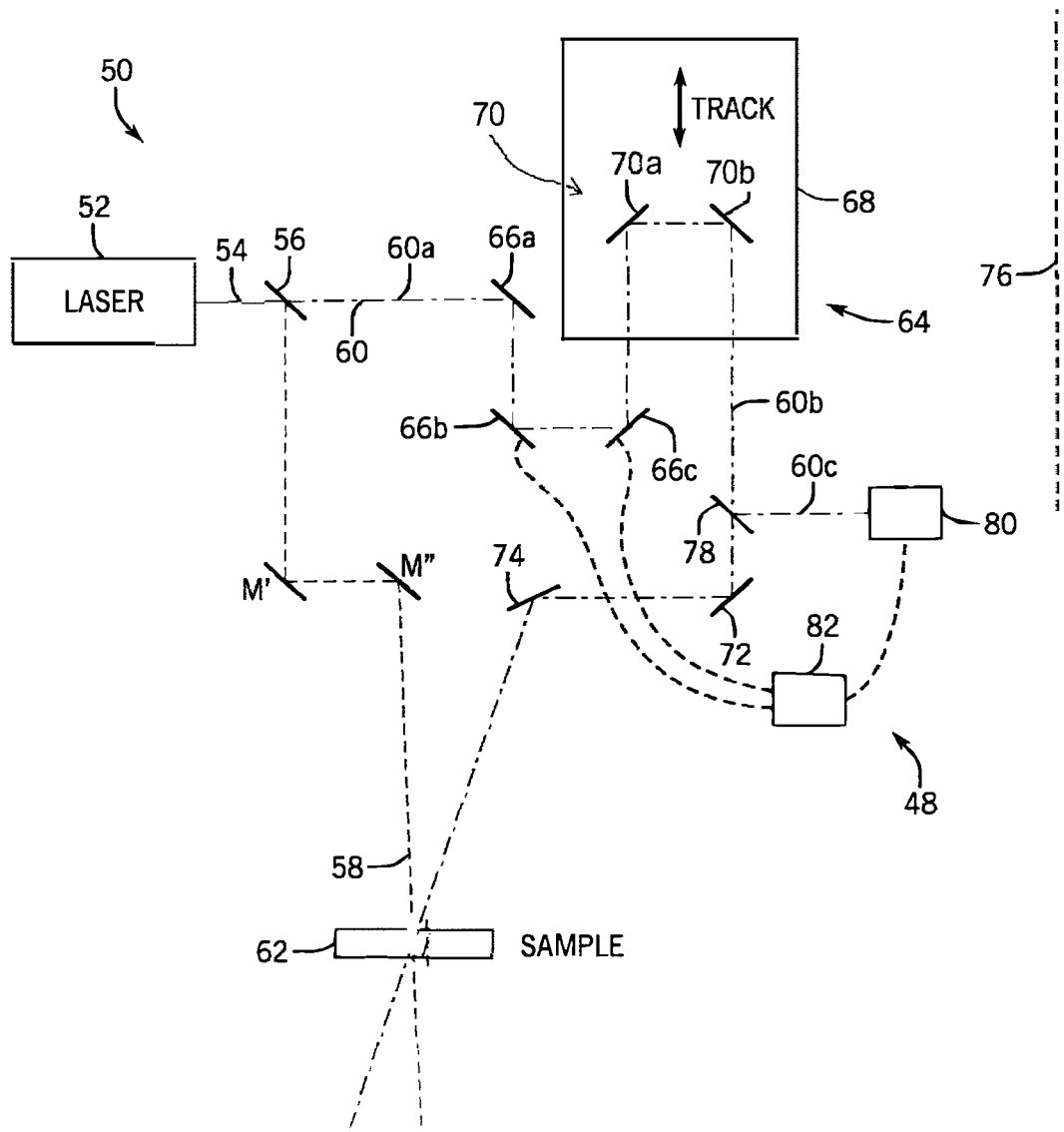
FIG. 3 is a depiction of an embodiment of a beam alignment system according to the invention.

FIG. 3 illustrates an embodiment of a system 50 for aligning a beam according to the invention, incorporated into a pump-probe measurement system.

As illustrated, the pump-probe system 50 includes a laser source 52 which generates a laser beam 54, and a semitransparent beam splitter (mirror) 56 which splits the laser beam 54 into a pump pulse beam 58 and a probe pulse beam 60. The two beams are directed along different optical paths to the sample 62 where the beams 58, 60 spatially overlap. The pump pulse beam 58 is directed via a series of mirrors (e.g., M', M") to the sample 62, and the probe pulse beam 60 is directed to the optical delay line 64 via a series of mirrors (e.g., 66a, 66b, 66c). In some embodiments, the pump pulse beam and the probe pulse beam can be interchanged. For example, a pump pulse beam can directed to the optical delay line via mirrors 66a, 66b, 66c and the probe pulse beam can be directed to the sample (e.g., via mirrors M', M").

The optical delay line 64 includes an optical retroreflector assembly 70 mounted on a computer controlled, motorized linear translation stage 68, which is translated (moved) along a track (arrow ↔). For illustration purposes, the retroreflector assembly 70 is shown with two mirrors 79a, 70b. The position of the translation stage 68 (with the retroreflector 70) is varied over the course of the pump-probe measurement period by motorized movement along the track to modify the length of the beam path of the probe pulse beam 60 relative to the length of the pump pulse beam 58, which delays the delivery of the probe pulse beam to the sample by a set time period. In embodiments, the outgoing probe beam 60b from the retroreflector 70 is directed by mirror 70b downstream from the delay line to mirror 72 onto mirror 74, which directs the beam onto the sample 62. In the pump-probe measurement process, the intensity of the probe pulse beam 60 after the sample is monitored as a function of the position of the delay line.

The present alignment system 50 provides for the pre-alignment of the outgoing probe pulse beam 60b by maintaining a proper alignment of the incoming probe beam 60a before it enters the delay line 64 to ensure the incoming beam 60a enters the delay line parallel to its axis of translation 76. After the pre-alignment steps are completed and a measurement procedure is commenced, the trajectory of the beam out of the retroreflector of the delay line is maintained without the need for detection of the beam or active beam stabilization to alter mirror angles or the trajectory of the incoming and outgoing beams into or out of the delay line.

In the embodiment of the alignment system 50 illustrated in FIG. 3, the incoming probe pulse beam 60a is steered into the variable (motorized) optical delay line 64 via the beam splitter (mirror) 56 to a mirror 66a, which directs the beam 60a to two computer-controlled, motorized steering mirrors 66b, 66c.

As part of the alignment system 50, a beam splitter (mirror) 78 is positioned in the path of the outgoing probe pulse beam 60b. The beam splitter 78 splits the outgoing probe pulse beam 60b into a beam 60c, and directs the beam 60c to a computer interfaced, position sensitive detector 80 (e.g., a laser beam profiler). Examples of position sensitive detectors include, for example, a 2D camera, a webcam, a quadrant photodetector, or other detecting device. The location of the beam 60c on the detector is recorded as a data point that corresponds to the outgoing beam 60b trajectory and pointing after exiting the optical delay line 64. The position sensitive detector 80 is connected to a computer (or other microprocessor) 82, which is connected to the two motorized steering mirrors 66b, 66c that steer the incoming probe pulse beam 60a into the optical delay line 64.

The alignment system of the invention utilizes a software-based method for pre-aligning the incoming probe beam into an optical delay line 64 at different locations of the delay line along a track while maintaining a constant, unvarying trajectory (pointing) of the outgoing probe beam after the delay line.

With reference to the system depicted in FIG. 3, in an embodiment of an alignment method according to the invention, the delay line (i.e., the translation stage 68) is first set at any position along the track, and an incoming probe beam 60a is steered into the optical delay line 64 by moving mirror 66b to direct to the beam to mirror 66c and into the delay line. The outgoing probe beam 60b exiting the delay line from mirror 70b is then intercepted and split by the beam splitter (mirror) 78, which directs beam 60c to the position sensitive detector 80. The location of the beam 60c on the detector 80 is transmitted to the computer 82.

Figure 5:
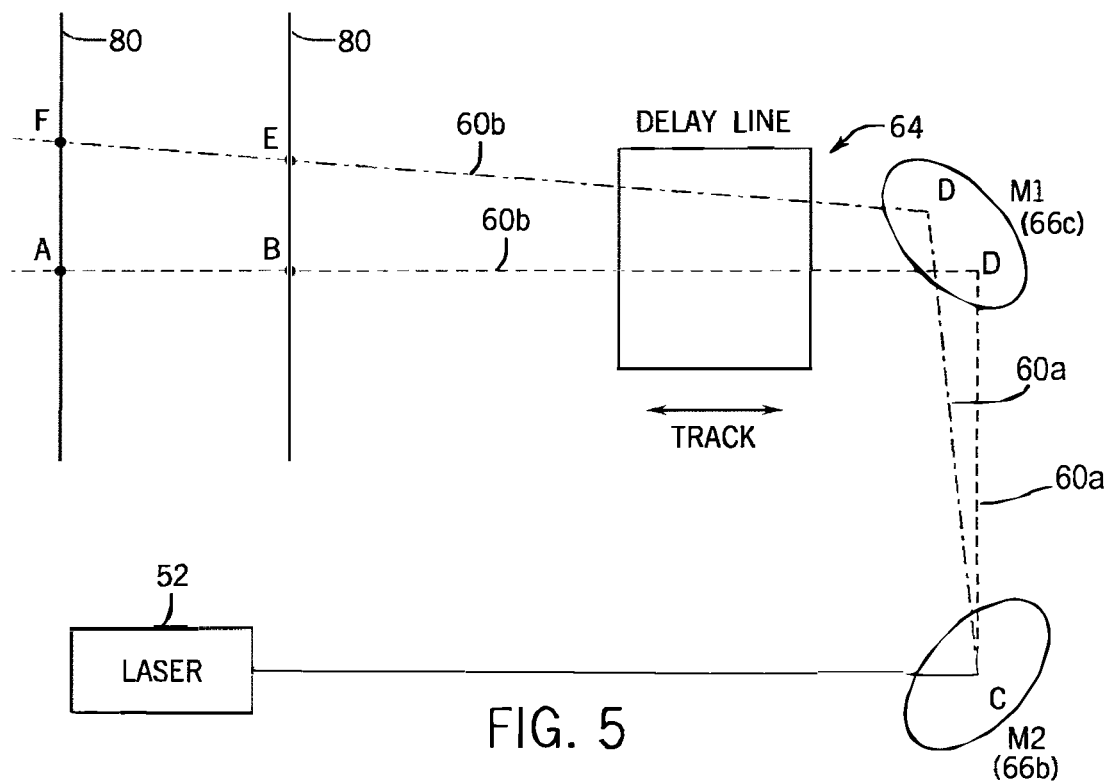
FIG. 5 is a depiction of an embodiment of an alignment process for a delay line and mirrors of a measuring system.

In an embodiment of an alignment method, in a first step (step 1), the translation stage 68 is moved to a first position which is the closest position on the track to mirror 66c. Mirror 66b is then rotated to a position to direct the beam 60a to mirror 66c and into the delay line such that the position (location) of the beam 60c is at a point B (as shown in FIG. 5) on the detector 80.

In a second step (step 2), the delay line 64 (i.e., translation stage 68) is translated (moved) along the track to a second position which is the farthest position on the track from mirror 66c. As a result of this translation and repositioning of the delay line along the track, the position of beam 60c on the detector 80 changes. Mirror 66c is then rotated to a position to direct the beam 60a (from mirror 66b) into the delay line such that the position of the beam 60c is at a point A on the detector 80.

Steps 1 and 2 of moving the delay line to the closest and farthest points from mirror 66c and rotating the steering mirrors 66b, 66c, are repeated as needed to reduce the displacement of the beam 60c on the detector 80 caused by repositioning of the translation stage 68 along the track to within an acceptable deviation or margin of error, for example, such that the difference between the positions of the beam 60c on the detector varies not more than 20 microns. Completion of the foregoing steps achieves an alignment of the beam 60a through the delay line 64 at the various locations of the delay line along the track.

According to embodiments of the methods of the invention, the pre-alignment steps and procedure situates each of the steering mirrors 66b, 66c at a set position whereby, over the course of a subsequent measurement procedure and without further alignment of the steering mirrors 66b, 66c, the trajectory of the incoming beam 60a into the delay line 64 is maintained parallel to its axis of translation 76 regardless of the location of the delay line along the track, and the trajectory of the outgoing beam 60b from the delay line 64 remains substantially constant such that it does not deviate outside an acceptable deviation/margin of error, for example, not more than 20 microns.

A general objective toward aligning a pump-probe spectrometer is to position the beam (e.g., outgoing beam 60b, FIG. 3) so that the beam travels through points A and B as the desired optical axis, as depicted in FIG. 5. Points A and B correspond to the same position on the detector 80, which means the beam does not shift on the detector as the position of the delay line 64 along the track is changed.

By example, in a set-up in which the steering mirrors (66b, 66c) and the delay line 64 are misaligned, the beam (e.g., outgoing beam 60b, FIG. 3) can travel along trajectory that is not the desired optical axis (A-B), such as trajectory C-D-E-F shown in FIG. 5. Then, in an embodiment of a pre-alignment method of the invention, in a first step (1), the computer-based processor (software) signals the translation stage 68 to move to a first position (e.g., farthest from mirror M1, e.g., 66c) and signals mirror M1 (e.g., 66c) to rotate to send the beam from point D (mirror M1, 66c) to point A on the detector 80. In a second step (2), the computer-based processor (software) signals the translation stage 68 to move to a second position (closest to mirror M1, e.g., 66c). However, by moving the translation stage 68, the beam will now be shifted on the detector 80 by a certain distance from point A. Thus, in step (2), the computer-based processor (software) signals mirror M2 (e.g., 66b) to turn to send the beam from point C (mirror M2, 66b) bouncing off mirror M1 (e.g., 66c) to point B on the detector 80. Steps 1 and 2 can then be repeated to achieve the desired accuracy of beam pointing onto the detector 80. After a few iterations of steps 1 and 2, the beam displacement on the detector 80 caused by the moving translation stage 68 will become acceptably small (within the measurement error, etc.) and the incoming beam 60a will be aligned through the delay stage 70 in such a way that the pointing and trajectory of the outgoing beam 60b does not change throughout the whole range of translation (movement) of stage 68 along the track, thus eliminating the need for readjustment of the alignment of the beam during a subsequent measurement procedure.

In another embodiment, the alignment method includes first determining the geometrical model of the system set-up prior to performing the alignment of the delay line. This allows for a minimized alignment time and a quickly converging algorithm. To devise the geometrical model of the system set-up, the approximate distances between the optical elements (i.e., the mirrors, etc.) are determined and recorded (e.g., entered into the software). For example, in the embodiment of the system depicted in FIG. 3, the distances between the following components can be measured and recorded: the distance the beam 60 travels between steering mirrors 66b, 66c, and the distance between mirror 66c and detector 70 for a given position of the delay line 64. Knowing these distances will allow the software to pre-calculate all sides and angles of triangles B-A-M, B$_1$-A-M, D-C-M and D$_1$-C-M (FIG. 4) relating to the angles of the steering mirrors to place the beam at a specific point on the detector for any given position of the delay line along the track. This, in turn, can be used to reduce the number of iterations that are described below (e.g., the repositioning of the mirrors and delay line).

In a next step, with the delay line (i.e., the translation stage 68) set at a first position, the two motorized steering mirrors 66b, 66c are positioned at a set angle, and an incoming probe beam 60a is steered via the mirrors 66b, 66c into the optical delay line 64. The outgoing probe beam 60b exiting the delay line is then intercepted and split by the beam splitter (mirror) 78, which directs beam 60c to the position sensitive detector 80. The location of the beam 60c on the detector 80 is transmitted to the computer-based processor 82. Then mirror 66b is moved and repositioned at a computed angle (as discussed below) along the vertical axis. The corresponding beam position shift is registered by detector 80 and the location data is transmitted to the computer. Then mirror 66b is moved and repositioned at a computed angle along the horizontal axis. The corresponding beam position shift is registered by detector 80 and the location data is transmitted to the computer. The same is then done for mirror 66c. The delay line (i.e., translation stage 68) is then translated (moved) along the track to a second position and the steps of repositioning mirrors 66b, 66c along their vertical and horizontal axes at different computed angles and detecting and recording the location of the outgoing (split) beam 60c on the detector are again repeated. Multiple data points of the position of the outgoing (split) beam 60c on the detector 60 are thus acquired and recorded by the computer-based processor.

Figure 4:
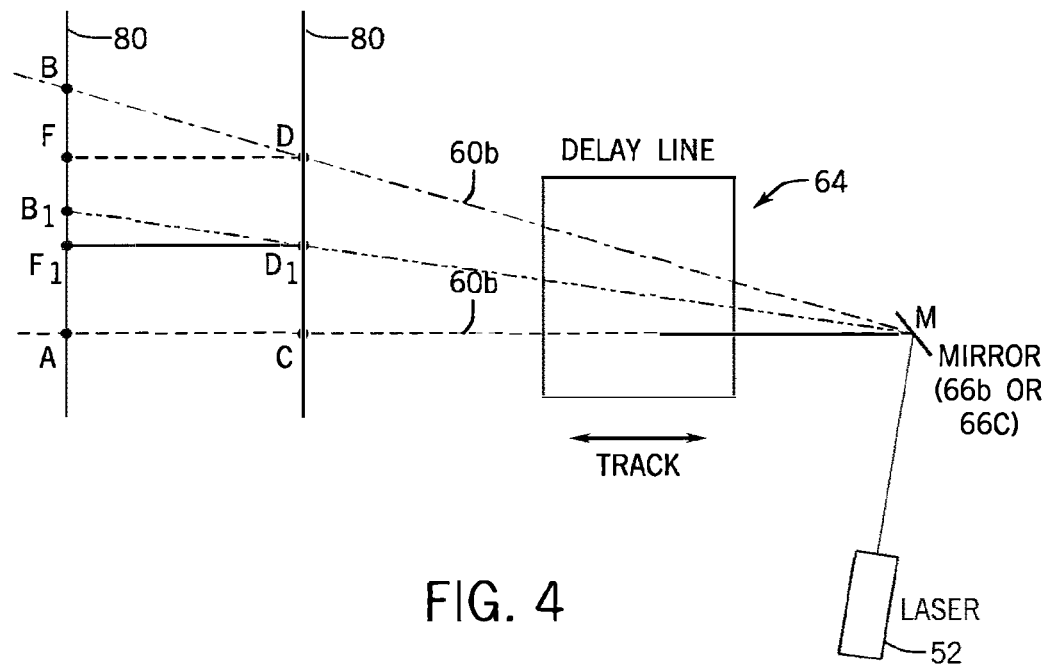
FIG. 4 is a depiction of an embodiment of a calibration process to determine the geometrical model of a measuring system.

The geometrical model of the set-up of the pump-probe device (e.g., as shown in FIG. 4) is then determined by processing the acquired data points (e.g., by the computer 82). The model data are saved and used to calculate desired angular adjustments of the steering mirrors 66b, 66c (i.e., computed angles) to ensure correct beam pointing (trajectory) and alignment of the incoming beam through the delay line. The computed angles of the steering mirrors 66b, 66c can be verified by the computer (e.g., software) by translating the delay line 64 over the length of the track and recording the position of the outgoing (split) beam 60c on the position sensitive detector 80. If the measured beam displacement on the detector is still too large, the procedure can undergo additional iterations until the desired beam displacement is achieved.

The present alignment system and methods provide for correct alignment of the incoming probe beam with the retroreflector of the optical delay line, resulting in the predetermined pointing (trajectory) of the outgoing probe pulse beam from the delay line remaining constant over the course of the probe-pump measurements without further alignment of the incoming or outgoing beam from the delay line during the measurement procedure. This ensures the correct spatial overlap of the pump pulse beam and the probe pulse beam in the sample and accurate data measurements of the sample.

Subsequent to the pre-alignment procedure, no active beam stabilization, for example, through a feedback loop to the computer-based processor, is required to maintain the trajectories of the incoming and outgoing beams into and out of the retroreflector of the outgoing beam over the course of a pump-probe measurement procedure. The steps of the pre-alignment procedure of the invention adjust the positions of the first and second mirrors to align the incoming laser beam with the retroreflector such that the trajectory of the incoming beam remains parallel to the axis of translation of the delay line throughout the varying positions of the delay line as it is moved along the track during a measurement procedure, resulting in the trajectory of the outgoing beam from the delay line remaining constant during the measurement procedure without an active beam stabilization procedure.

Calibration/Calculation of Geometrical Model

FIG. 4 illustrates a calibration principle of each of the motorized steering mirrors 66b, 66c (shown in FIG. 3), that is, a determination (calculation) of the geometrical model of the pump-probe system incorporating the alignment elements according to an embodiment of the invention. In embodiments, the geometrical model of the alignment system can be calculated to determine the angles of the steering mirrors (66b, 66c) that are required to place the beam at any specific point on the detector 80 for any given delay line track position.

The position of the retroreflector 70 on the optical delay line 64 dictates the distance the light has to travel between mirror M (66b or 66c) and the position sensitive detector 80. Therefore, by moving the delay line, the plane of the position sensitive detector 80 is effectively positioned closer or farther away from mirror M (66b or 66c), which is illustrated in FIG. 4.

The position sensitive detector 80, which remains stationary, is situated in a plane AB or plane CD, depending on the position of the delay line 64, which translates (moves) along the track (arrow ↔). By controlling the position of the delay line 64 along the track, the plane of the detector 80 can be shifted arbitrarily with respect to the mirror M (e.g., 66b, 66c).

In an embodiment of the method of the invention, a calibration to determine the geometrical model of the pump-probe system 50 (FIG. 3) is conducted by acquiring and recording multiple data points of the position of the outgoing (split beam 60c) on the detector 80, as described above. In brief, with the delay line/translation stage 68 at a first position, a beam 60a is steered into the delay line via mirrors 66b, 66c, which are positioned at set angles, and the exiting beam 60b is split into beam 60c, and the location of the beam (60c) on the detector 80 is sent to the processor. The angle of mirror 66b is then repositioned along its vertical axis and the shift in location of the beam (60c) on the detector 80 is sent to the processor 80. The angle of mirror 66b is then repositioned along its horizontal axis and the shift in location of the beam (60c) on the detector 80 is transmitted to the processor 80. The same repositioning of mirror 66c along its vertical and horizontal axes and transmittal of the beam locations on the detector is then performed. The delay line/translation stage 68 is then moved to a second position on the track, and the steps of repositioning the mirrors 66b, 66c along their vertical and horizontal axes and recording the locations of the beam (60c) on the detector are repeated. The calibration is then used to establish a relation between the rotation angle (angle A-M-B) of the mirror M (66b, 66c) and the displacement of the laser beam on the detector 80 in plane AB or plane CD, depending on the position of the delay line 64. Upon establishing this relation, the software can predict to what angle a mirror (66b, 66c) needs to be turned during the pre-alignment procedure in order for the beam to be incident at a particular point on the detector 80 throughout the entire range of movement of the delay line 64 along the track, i.e., the varying distance the beam has to travel to the detector 80 from the mirror (66b, 66c) that is being turned.

Alignment

In an embodiment of the present alignment method, upon conducting the foregoing calibration process and determining the geometrical model of the pump-probe system 50 (incorporating the alignment elements) (e.g., by determining the angles of the steering mirrors to place the beam at a specific point on the detector at any given location of the delay line on the track), a pre-alignment process is then conducted.

As discussed above, a general objective toward aligning a pump-probe spectrometer is to position the beam (e.g., outgoing beam 60b, FIG. 3) so that the beam travels through points A and B as the desired optical axis, as depicted in FIG. 5. Points A and B correspond to the same position on the detector 80, which means the beam does not shift on the detector as the position of the delay line 64 along the track is changed.

By example and again with reference to FIG. 5, in a set-up in which the steering mirrors (66b, 66c) and the delay line 64 are misaligned, the beam (e.g., outgoing beam 60b, FIG. 3) can travel along trajectory that is not the desired optical axis (A-B), such as trajectory C-D-E-F. Having performed the calibration procedure for mirrors M1 and M2 (66b, 66c), the computed angle at which each of these mirrors must be turned in order for the beam to simultaneously hit any of the two pairs of points A and B or E and F has been determined.

Thus, in an embodiment, in a first step (1) of the alignment process, the computer signals the delay stage to move to the end of the track farther away from mirror M1 (e.g., 66c). In a second step (2), the computer-based processor (software) signals mirror M1 to rotate to the computed angle to send the beam from point D (mirror M1, 66c) to point A on the detector 80. In a third step (3), the computer-based processor (software) signals the delay stage to move closer to mirror M1. In a fourth step (4), the computer-based processor (software) signals mirror M2 (e.g., 66b) to turn to the computed angle to send the beam from point C (mirror M2, 66b) bouncing off mirror M1 (e.g., 66c) to point B on the detector 80. However, by moving the mirror M2, the beam will now be shifted on the detector 80 by a certain distance from point A. Steps 1 through 4 can then be repeated to achieve the desired accuracy of beam pointing onto the detector 80. After a few such iterations of steps (1) through (4), the beam displacement on the detector 80 caused by the moving translation stage 68 will become acceptably small (within the allowed deviation, measurement error, etc.) and the incoming beam 60a will be aligned through the delay stage 70 in such a way that the pointing and trajectory of the outgoing beam 60b does not change throughout the entire range of translation (movement) of stage 68 along the track, thus eliminating the need for readjustment of the alignment of the beam during a subsequent measurement procedure.

In another embodiment of a pre-alignment process according to the invention, based on the geometrical model of the setup (as described above), the computer (software) can pre-calculate the degree to which the mirror M1 (e.g., 66c) should be rotated (i.e., the computed angles) in order to overshoot a point A on the detector 80 to compensate for the subsequent rotation of mirror M2 (e.g., 66b). In such an embodiment, in a first step (1), the computer (software) signals to rotate mirror M1 (e.g., 66c) to a computed angle such that the beam overshoots point A on the detector 80 just enough to compensate for the subsequent rotation of mirror M2 (e.g., 66b). In a second step, the computer (software) signals mirror M2 (e.g., 66b) to turn to a computed angle which directs the beam to M1 (e.g., 66c) and then exactly to point A on the detector 80. Since mirror M1 (e.g., 66c) is placed in a correct position in step one (1), the beam will then go exactly through points B and A. To compensate for instrument errors related to the accuracy of the mirror rotation, etc., steps 1 and 2 can be repeated as necessary to achieve the desired accuracy of beam pointing on the detector 80.

In other embodiments, alternative orders for mirror rotation can be utilized and detector feedback can be used where necessary during the pre-alignment steps.

It should be appreciated that the present invention is intended to encompass numerous embodiments. For example, in embodiments, the invention relates to a system for aligning a light beam in a spectroscopic measuring device, the aligning system comprising: a first motorized mirror positioned to receive and transmit a light beam; a second motorized mirror positioned relative to the first mirror to receive the light beam from the first mirror and transmit the light beam to a delay line; a third mirror positioned to receive the light beam from the delay line and transmit said light beam to a detector; and a computer-based processor in communication with the detector and the first and second mirrors, the processor configured to a) receive and process data relating to the light beam from the detector, and b) cause movement of the first and second mirrors to change an angle of the mirrors based on the data relating to the light beam.

The alignment system of the invention provides for the pre-alignment of a light beam before the commencement of a measurement procedure such that the trajectory of the beam out of the retroreflector of a delay line is maintained as the delay line is translated along a track over the course of the measurement procedure without the need for monitoring or detection of the beam or an active beam stabilization to alter mirror angles or the trajectory of the incoming and outgoing beams into or out of the delay line. The pre-alignment of a light beam according to embodiments of the invention maintains a proper alignment of the beam over the course of a measurement procedure such that the beam enters a delay line parallel to its axis of translation as the delay line is moved to varying locations along a track.

In an embodiment, the invention relates to a system for pre-aligning a light beam in a pump-probe spectroscopic measuring device prior to a measurement procedure, the aligning system comprising: a motorized, variable optical delay line comprising a retroreflector and being moveable along a track along an axis of translation; a position sensitive detector; a first motorized mirror positioned to receive and transmit an incoming light beam; a second motorized mirror positioned relative to the first mirror to receive the incoming light beam from the first mirror and transmit the incoming light beam to the retroreflector of the delay line, the second mirror positioned apart from and prior to the delay line; a third mirror positioned to receive an outgoing light beam from the retroreflector of the delay line and transmit said outgoing light beam to a detector; and a computer-based processor in communication with the detector, the delay line and the first and second mirrors, the processor configured to: a) receive and process data relating to the outgoing light beam from the detector, and b) cause movement of the first and second mirrors to position the mirrors at a set angle based on the data relating to the outgoing light beam from the detector, to align the incoming beam and the outgoing beam along a trajectory such that the incoming beam enters the delay line parallel to its axis of translation and the outgoing beam does not substantially shift on the detector as the position of the delay line is changed; and the processor configured to conduct steps a) and b) solely during a pre-alignment process prior to a measurement procedure.

In an embodiment, the invention relates to a method for pre-aligning a light beam in a pump-probe spectroscopic measuring device prior to conducting a pump-probe measurement procedure, the pump-probe spectroscopic measuring device comprising an alignment system comprising optical components comprising first and second motorized mirrors for transmitting a light beam to a variable optical delay line being moveable along a track, a position sensitive detector, and a computer-based processor; the method for pre-aligning the light beam comprising: 1) Moving the optical delay line to a first position along the track, rotating the first mirror to a first position, conducting a beam to the first and second mirrors and through the delay line to the detector, and transmitting data of a first location of the beam on the detector and the first position of the first mirror to a computer-based processor; 2) Moving the optical delay line to a second position along the track far from the second mirror, rotating the second mirror to a first position, so that a beam, which is conducted to the first and second mirrors and through the delay line to the detector, is incident on a set position on the detector, and transmitting data of a first location of the beam on the detector and the first position of the first mirror to the computer-based processor; 3) Moving the optical delay line back to a first position along the track; 4) Determining the difference between the first and second positions of the beam on the detector and comparing said difference to a pre-determined allowable deviation; and 5) Repeating steps 1 through 4 if said difference is greater than a pre-determined allowable deviation; wherein after the pre-aligning steps and over the course of a pump-probe measurement process, as the delay line is moved along the track, transmission of the incoming beam from the first and second mirrors into the delay line parallel to its axis of translation and the trajectory of the outgoing beam from the delay line are maintained without monitoring the outgoing beam on the detector, without active beam stabilization through a feedback loop to the computer-based processor, and without changing the angles of the first and/or second motorized mirrors.

In another embodiment, the invention relates to a method for aligning a light beam in a spectroscopic measuring device, the method comprising:

a) Optionally, determining distances between optical components of an alignment system, the optical components comprising first and second motorized mirrors for transmitting the light beam to a delay line, a detector, and a third mirror for transmitting the light beam to the detector;

b) With the delay line in a first position and each of the first and second mirrors set at a first angle, conducting a light beam to the delay line via the first and second mirrors such that the light beam exiting the delay line is transmitted to the detector via the third mirror;

c) Transmitting a first location of the beam on the detector to a computer-based processor;

d) Establishing a relationship between the angle of the first mirror and the position of the beam on the detector;

e) Establishing a relationship between the angle of the second mirror and the position of the beam on the detector; and f) Establishing a relationship between the position of the delay line and the position of the beam on the detector.

In an embodiment, the method further comprises verifying the beam alignment of the beam by registering the beam position on the detector at different positions of the delay line.

In an embodiment, after step f), the method further comprises a step g) Determining how the beam position on the detector depends on the angles of the first and second mirrors and the position of the delay line.

In an embodiment, step g) comprises determining how the beam position (60*b*) on the detector (80) depends on the angles of the first and second mirrors (M1, e.g., 66*c*, and M2, e.g., 66*b*) and the position of the delay line (64). In an embodiment, a determination of this relationship involves calculating all sides and angles of triangle C-D-M, illustrated in FIG. 4. In an embodiment, the calculation can be conducted by measuring the distance C-M between the detector 80 and the mirror M (e.g., 66*b* or 66*c*) (e.g., using a ruler). Moving the delay line 64 by a distance F-D will result in a shift of the beam 60*b* on the detector 80 by a distance B-F. Angle B-F-D is known (e.g., 90°), which allows the calculation of angle F-D-B, which is the same as angle C-M-D. Angle D-C-M is known (e.g., 90°), which allows one to calculate all sides and angles of triangle C-D-M.

In another embodiment, the step g) of determining the relationship of the beam position on the detector 80 with the angles of the mirrors (e.g., 66*b*, 66*c*) and the position of the delay line 64 can be conducted by pointing the beam 60b from mirror M (e.g., 66b or 66c) towards point D of the detector 80. The delay line 64 can then be moved by a distance D-F to translate the detector 80 from plane C-D to plane A-B and register the beam shift distance B-F. Then, mirror M can be rotated to send the beam 60b to point B1 on the detector 80 and register the shift of the beam position B-B1. Then, delay line 64 can be moved back to bring the detector 80 back to plane C-D and register the beam shift distance B1-F1. Angles B-F-D and B1-F1-D1 are known (e.g., 90°), which allows the calculation of all sides and angles of triangles B-D-F and B1-D1-F1. This calculation then allows the calculation of all sides and angles of triangle D-D1-M. With the distance D1-M known, angle D1-C-M (e.g., 90°) and angle C-D1-M (e.g., 180° minus D-D1-M), one can calculate all sides and angles of triangle D1-C-M. Now, knowing all sides and angles of triangles D-D1-M and D1-C-M, one can easily calculate all sides and angles of triangle C-D-M. Other methods of calculating all sides and angles of triangle C-D-M can be used.

In an embodiment, after step g), the method further comprises a step h) Adjusting the angles of the first and second mirrors to transmit the beam to a desired position on the detector.

In an embodiment, steps d) and e) of establishing a relationship between the angle of the first and second mirrors and the position of the beam on the detector comprises:

(1) Moving the first or second mirror at a first angle along a vertical axis to transmit the beam to the detector, registering a location of the beam on the detector, and transmitting said beam location to the computer-based processor;

(2) Moving the mirror of step (1) at a second angle along a horizontal axis to transmit the beam to the detector, registering a location of the beam on the detector and transmitting said beam location to the computer-based processor; and (3) Repeating steps (1) and (2) for the other of the first and second mirrors.

In an embodiment, step f) of establishing a relationship between the position of the delay line and the position of the beam on the detector comprises:

(1) Moving the delay line to a second position; and (2) Moving the first or second mirror at a first angle along a vertical axis to transmit the beam to the detector, registering a location of the beam on the detector, and transmitting said beam location to the computer-based processor;

(3) Moving the mirror of step (2) at a second angle along a horizontal axis to transmit the beam to the detector, registering a location of the beam on the detector, and transmitting said beam location to the computer-based processor; and (4) Repeating steps (2) and (3) for the other of the first and second mirrors.

In an embodiment, after step (4), the method further comprises a step (5) Moving the delay line to a third position and repeating steps (2) through (4).

In an embodiment, after step (5), the method further comprises:

(6) Determining how the beam position on the detector depends on the angles of the first and second mirrors and the position of the delay line.

In an embodiment, step f) of establishing a relationship between the position of the delay line and the position of the beam on the detector comprises:

(1) Moving the delay line to a second position, and a) Moving the first mirror at a first angle along a vertical axis to transmit the beam to the detector, registering a location of the beam on the detector, and transmitting said beam location to the computer-based processor;

b) Moving the first mirror at a second angle along a horizontal axis to transmit the beam to the detector, registering a location of the beam on the detector, and transmitting said beam location to the computer-based processor;

c) Moving the second mirror at a first angle along a vertical axis to transmit the beam to the detector, registering a location of the beam on the detector, and transmitting said beam location to the computer-based processor;

d) Moving the second mirror at a second angle along a horizontal axis to transmit the beam to the detector, registering a location of the beam on the detector, and transmitting said beam location to the computer-based processor;

(2) Moving the delay line to a third position and repeating steps (1a) through (1d); and (3) Determining how the beam position on the detector depends on the angles of the first and second mirrors and the position of the delay line.

In another embodiment, the invention relates to a method for aligning a light beam in a spectroscopic measuring device, the method comprising:

a) Optionally, determining distances between optical components of an alignment system, the optical components comprising first and second motorized mirrors for transmitting the light beam to a delay line, a detector, and a third mirror for transmitting the light beam to the detector;

b) With the delay line in a first position and each of the first and second mirrors set at a first angle, conducting a light beam to the delay line via the first and second mirrors such that the light beam exiting the delay line is transmitted to the detector via the third mirror;

c) Transmitting a first location of the beam on the detector to a computer-based processor;

d) Establishing a relationship between the angle of the first mirror and the position of the beam on the detector:

(1) moving the first mirror at a first angle along a vertical axis;

(2) registering a second location of the beam on the detector and transmitting said second beam location to the computer-based processor;

(3) moving the first mirror at a second angle along a horizontal axis; and (4) registering a third location of the beam on the detector and transmitting said third beam location to the computer-based processor;

e) Establishing a relationship between the angle of the second mirror and the position of the beam on the detector:

(1) moving the second mirror at a first angle along a vertical axis;

(2) registering a fourth location of the beam on the detector and transmitting said fourth beam location to the computer-based processor;

(3) moving the second mirror at a second angle along a horizontal axis; and (4) registering a fifth location of the beam on the detector and transmitting said fifth beam location to the computer-based processor;

f) Establishing a relationship between the position of the delay line and the position of the beam on the detector:

(1) moving the delay line to a second position; and
  (1a) moving the first mirror at a first angle along a vertical axis;
  (1b) registering a sixth location of the beam on the detector and transmitting said sixth beam location to the computer-based processor;
  (1c) moving the first mirror at a second angle along a horizontal axis; and
  (1d) registering a seventh location of the beam on the detector and transmitting said seventh beam location to the computer-based processor;
  (1e) moving the second mirror at a first angle along a vertical axis;
  (1f) registering a eight location of the beam on the detector and transmitting said eighth beam location to the computer-based processor;
  (1g) moving the second mirror at a second angle along a horizontal axis; and
  (1h) registering a ninth location of the beam on the detector and transmitting said ninth beam location to the computer-based processor; and
(2) moving the delay line to a third position and repeating steps (1a) through (1h);
g) Processing the beam position changes on the detector to correspond the changes in angles of the first and second mirrors with the position of the delay line; and
h) Adjusting the angles of the first and second mirrors to send the beam to a desired position on the detector.

In another embodiment, the invention relates to a method for aligning a light beam in a spectroscopic measuring device, the device comprising an alignment system, and the method comprising:

optionally, determining distances between optical components of the alignment system, the optical components comprising first and second motorized mirrors, a third mirror, and a detector;

transmitting a light beam from a first mirror to a second mirror and then through a delay line situated in a first position to a detector, and recording a location of the light beam on the detector;

recording the locations of the light beam on the detector after altering an angle of the first mirror, and after altering an angle of the second mirror;

moving the delay line to a second position and to a third position, and at each of the second and third positions of the delay line, recording the locations of the light beam on the detector after altering an angle of the first mirror, and after altering an angle of the second mirror;

processing the beam position changes on the detector to correspond the changes in angles of the first and second mirrors with the position of the delay line; and adjusting the angles of the first and second mirrors to send the beam to a desired position on the detector.

In an embodiment of the method, the angles of the mirrors are altered along at least one of a vertical axis and a horizontal axis, and the locations of the light beam are recorded for each of the angles along said vertical axis and said horizontal axis. In an embodiment, the angles of the mirrors are altered along both a vertical axis and a horizontal axis.

In another embodiment, the invention relates to a method for aligning a light beam in a spectroscopic measuring device, the device comprising an alignment system, and the method comprising:

optionally, determining distances between optical components of the alignment system, the optical components comprising first and second motorized mirrors, a third mirror, and a detector;

transmitting a light beam from a first mirror to a second mirror and then through a delay line situated in a first position to a detector, and recording a location of the light beam on the detector;

recording the locations of the light beam on the detector after altering an angle of the first mirror;

recording the locations of the light beam on the detector after altering an angle of the second mirror;

moving the delay line to a second position, and recording the locations of the light beam on the detector after altering an angle of the first mirror, and after altering an angle of the second mirror;

moving the delay line to a third position, and recording the locations of the light beam on the detector after altering an angle of the first mirror, and after altering an angle of the second mirror;

processing the beam position changes on the detector to correspond the changes in angles of the first and second mirrors with the position of the delay line; and adjusting the angles of the first and second mirrors to send the beam to a desired position on the detector.

In an embodiment of the method, the angles of the mirrors are altered along at least one of a vertical axis and a horizontal axis, and the locations of the light beam are recorded for each of the angles along said vertical axis and said horizontal axis.

It is specifically intended that the present invention not be limited to the embodiments and illustrations contained herein, but include modified forms of those embodiments including portions of the embodiments and combinations of elements of different embodiments as come within the scope of the following claims.

We claim:

1. A system for pre-aligning a light beam in a pump-probe spectroscopic measuring device prior to a measurement procedure, the system comprising:
  a motorized, variable optical delay line comprising a retroreflector and being moveable along a track along an axis of translation;
  a position sensitive detector;
  a laser source that generates a laser beam and transmits the laser beam to a first beam splitter, the first beam splitter configured to split the laser beam into a pump pulse beam and a probe pulse beam;
  a first mirror positioned to receive and transmit the pump pulse beam;
  a second mirror positioned relative to the first mirror to receive the pump pulse beam from the first mirror and transmit the pump pulse beam to a sample;
  a third mirror positioned to receive and transmit the probe pulse beam, the third mirror being a motorized mirror;
  a fourth mirror positioned relative to the third mirror to receive the incoming probe pulse beam from the third mirror and transmit the incoming probe pulse beam to the retroreflector of the delay line, the fourth mirror positioned apart from and prior to the delay line, the fourth mirror being a motorized mirror;
  a second beam splitter positioned to receive an outgoing probe pulse beam from the retroreflector of the delay line and configured to split the outgoing probe pulse beam into a sample beam and a position beam, the second beam splitter positioned to transmit (i) the sample beam to the sample and (ii) the position beam to a position sensitive detector; and a computer-based processor in communication with the position sensitive detector, the delay line and the third and fourth mirrors, the processor configured to:
  a) receive and process data relating to the position beam from the position sensitive detector, and
  b) cause movement of the third and fourth mirrors to position the third and fourth mirrors at a set angle based on the data relating to the location of the position beam on the position sensitive detector, to align the incoming probe pulse beam and the outgoing probe pulse beam along a trajectory such that the incoming probe pulse beam enters the delay line parallel to its axis of translation and the outgoing probe pulse beam is incident on the position sensitive detector at a location having a deviation of not more than 20 microns during the pre-alignment procedure as the position of the delay line is changed;

the processor configured to conduct steps a) and b) solely during a pre-alignment process prior to a measurement procedure.

2. The system of claim 1, wherein the third mirror is a dual-axis motorized mirror that is alterable about a vertical axis and a horizontal axis.

3. The system of claim 1, wherein the fourth mirror is a dual-axis motorized mirror that is alterable about a vertical axis and a horizontal axis.

4. The system of claim 1, wherein the position sensitive detector is selected from the group consisting of a 2D camera, a webcam, and a quadrant photodetector.

5. The system of claim 1, further comprising
a fifth mirror positioned to receive the sample beam from the second beam splitter and transmit the sample beam to a sixth mirror;
the sixth mirror positioned to receive the sample beam from the fifth mirror and transmit the sample beam to the sample.

6. The system of claim 1, wherein the retroreflector comprises
a first retroreflector mirror positioned to receive the incoming probe pulse beam from the fourth mirror and to transmit the incoming probe pulse beam to a second retroreflector mirror;
the second retroreflector mirror positioned to receive the incoming probe pulse beam from the first retroreflector mirror and to transmit the outgoing probe pulse beam to the second beam splitter.

7. A method for pre-aligning a light beam in a pump-probe spectroscopic measuring device prior to conducting a pump-probe measurement procedure,
the pump-probe spectroscopic measuring device comprising an alignment system comprising optical components comprising first and second motorized mirrors for transmitting a light beam to a variable optical delay line being moveable along a track, a position sensitive detector, and a computer-based processor;

the method for pre-aligning the light beam comprising:
  1) moving the optical delay line to a first position along the track close to the second mirror, rotating the first mirror to a first position, so that a beam, which is conducted to the first and second mirrors and through the delay line to the detector, is incident on first location on the detector, and transmitting data of a first location of the beam on the detector to the computer-based processor;
  2) moving the optical delay line to a second position along the track far from the second mirror, rotating the second mirror to a second position, so that a beam, which is conducted to the first and second mirrors and through the delay line to the detector, is incident on the first location on the detector;
  3) moving the optical delay line back to a first position along the track so that a beam, which is conducted to the first and second mirrors and through the delay line to the detector, is incident on a second location on the detector, and transmitting data of the second location of the beam on the detector to the computer-based processor;
  4) determining the difference between the first and second locations of the beam on the detector and comparing said difference to a pre-determined allowable deviation; and
  5) repeating steps 1 through 4 if said difference is greater than a pre-determined allowable deviation, wherein after the pre-aligning steps and over the course of a pump-probe measurement process, as the delay line is moved along the track, transmission of the incoming beam from the first and second mirrors into the delay line parallel to its axis of translation and the trajectory of the outgoing beam from the delay line are maintained without monitoring the outgoing beam on the detector, without active beam stabilization through a feedback loop to the computer-based processor, and without changing the angles of the first and/or second motorized mirrors.

8. The method of claim 7, further comprising determining distances between the optical components of the alignment system, and using said distances to pre-calculate the angles of the steering mirrors to place the beam at a specific point on the detector for any given position of the delay line along the track.

9. The method of claim 7, wherein the pre-determined allowable deviation is not more than 20 microns.

* * * * *